US006971408B2

(12) United States Patent
Ertle et al.

(10) Patent No.: US 6,971,408 B2
(45) Date of Patent: Dec. 6, 2005

(54) POWER STEERING SYSTEM FOR MOTOR VEHICLES

(75) Inventors: Peter Ertle, Durlangen (DE); Markus Schuster, Schwaebisch Gmuend (DE); Dieter Sauter, Heubach (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 71 days.

(21) Appl. No.: 10/731,944

(22) Filed: Dec. 10, 2003

(65) Prior Publication Data

US 2004/0123730 A1 Jul. 1, 2004

Related U.S. Application Data

(63) Continuation of application No. PCT/EP02/06118, filed on Jun. 5, 2002.

(30) Foreign Application Priority Data

Jun. 27, 2001 (DE) ................................ 101 31 077

(51) Int. Cl.[7] ................................ B62D 5/083
(52) U.S. Cl. ................................ 137/625.21; 91/375 R
(58) Field of Search ...................... 137/625.21, 625.23; 91/374, 375 R, 375 A; 180/417, 441

(56) References Cited

U.S. PATENT DOCUMENTS

| | | | | |
|---|---|---|---|---|
| 4,877,100 | A * | 10/1989 | Emori et al. | 91/375 A |
| 4,966,192 | A * | 10/1990 | Umeda | 137/625.23 |
| 5,135,068 | A * | 8/1992 | Emori et al. | 91/375 A |
| 5,230,273 | A * | 7/1993 | Fraley, Jr. | 91/375 A |
| 5,571,238 | A * | 11/1996 | Breitweg et al. | 91/375 A |
| 5,575,193 | A * | 11/1996 | Bareis et al. | 91/375 A |
| 5,582,091 | A * | 12/1996 | Eberhart | 91/375 R |
| 5,769,121 | A * | 6/1998 | Breitweg | 137/625.23 |
| 5,957,027 | A * | 9/1999 | Gilbert et al. | 91/375 A |
| 6,250,334 | B1 * | 6/2001 | Abraham et al. | 137/625.23 |
| 6,267,133 | B1 * | 7/2001 | Hofmann et al. | 137/625.23 |
| 6,276,487 | B1 * | 8/2001 | Bieber et al. | 180/426 |
| 6,779,558 | B1 * | 8/2004 | Bruck et al. | 137/625.65 |

FOREIGN PATENT DOCUMENTS

DE 42 20 624 1/1994

* cited by examiner

*Primary Examiner*—John Rivell
(74) *Attorney, Agent, or Firm*—Jordan and Hamburg LLP

(57) ABSTRACT

A power steering system for motor vehicles, fitted with a rotary disk valve and comprising a reaction piston (1) defining an active (2) and a passive reaction chamber (3). A servo pressure can be fed to the reaction chamber (2) in order to modify the actuating force on the steering wheel. A damping piston (4)is arranged on the active reaction chamber (2) in order to receive dynamic oscillations of the reaction pressure.

17 Claims, 2 Drawing Sheets

POWER STEERING SYSTEM FOR MOTOR VEHICLES

BACKGROUND OF THE INVENTION

The invention relates to a power steering system for motor vehicles, having a rotary slide valve which has a reaction piston which delimits an active and a passive reaction chamber.

The invention relates to a power steering system for motor vehicles, having a rotary slide valve which has a reaction piston which delimits an active and a passive reaction chamber, in accordance with the precharacterizing clause of claim 1.

A power steering system of the generic type is known from DE 197 47 639 A1.

Here, the laid-open specification of the generic type has a rotary slide valve with a rotary slide, a centering device being arranged between the rotary slide and a valve output member, said centering device comprising two centering elements which can rotate with respect to one another and at least one rolling body situated between the two centering elements. Here, one centering element is firmly connected to a reaction piston and is connected to the valve output member via a metal bellows so as not to rotate but to be axially displaceable. The other centering element is connected to the rotary slide so as to neither rotate nor be displaceable. The reaction piston is arranged around the rotary slide, radially outside the latter, in the region of the centering device and protrudes in the axial direction into the region of the rotary slide. The reaction piston is guided in a sealing manner both on the valve output element and also in a valve housing. It thus delimits an active and a passive reaction chamber, it being possible to supply a boost pressure, dependent on the steering force, to the active reaction chamber via a line. The boost pressure can be influenced in a known manner by an electrohydraulic converter as a function of the vehicle speed or of other parameters. Here, the reaction chamber can comprise the metal bellows or be configured in a space lying opposite the metal bellows with respect to the reaction piston. In the latter case, the reaction piston acts counter to the force of the metal bellows. The metal bellows is subjected to relatively high prestressing which is relieved during application by the reaction pressure being applied.

With respect to the further prior art, with reference to the functioning of reaction pistons, reference is made, furthermore, to DE 197 40 352 A1.

A selective pressure results from the reaction piston or the pressure difference, acting on the reaction piston, between the active and passive reaction chamber, said selective pressure leading to an advantageous steering sensation, as a result of a corresponding reaction to the steering handle, as a function of various parameters, in particular the traveling speed. This is achieved by a corresponding increase in the steering moment.

However, a reaction of this type or the increase in the steering moment is only desirable for static or controlled processes. In the event of undesirable influences, caused, for example, by roadway impacts, introduced disturbances or in specific driving states, dynamic processes may occur which trigger a pressure fluctuation in the reaction chamber, said pressure fluctuation causing an undesirable fluctuation in moment at the steering handle. The increased susceptibility to jolting in the event of severe oscillation of the pressure difference consequently leads to perceptible decreases in comfort, i.e. to jolts at the steering wheel as a result of the torque. The pressure difference oscillates particularly severely when one of the two reaction pressures oscillates severely or when the two reaction pressures are in antiphase.

SUMMARY OF THE INVENTION

The present invention is therefore based on the object of improving a power steering system of the type mentioned in the introduction, such that undesirable dynamic processes or introduced disturbances do not cause any decreases in comfort, in particular no jolts at the steering wheel as a result of the torque, and such that this improvement can be realized as cost effectively, simply and close to serial production as possible.

According to the invention, this object is achieved by connecting a damping piston to the active reaction chamber in order to absorb dynamic oscillations of the reaction pressure.

According to the invention, this object is also achieved by the power steering system described in claim 10, claim 11 and claim 14.

Severe oscillations between the reaction pressures of the active and passive reaction chambers are avoided by virtue of the fact that a damping piston is connected to the active reaction chamber. Because a damping piston is used, the oscillations in the pressure difference do not act exclusively on the surface of the reaction piston, but are absorbed by the reaction piston. The increased susceptibility to jolting during rapid traveling states with a defined track rod preload and introduced disturbances no longer leads to jolts caused by the torque, as has been shown in experiments. In practise, the damping piston serves as a soft pressure accumulator, which absorbs dynamic pressure fluctuations but correspondingly settles at constant pressure conditions. Dynamic pressure peaks which occur are thus not directly converted into mechanical energy, but are absorbed by the change in volume resulting from the damping piston.

The pressure amplitude in the active reaction chamber is discernibly reduced by the damping piston connected to the active reaction chamber.

It is advantageous if the side, remote from the active reaction chamber, of the damping piston is stressed counter to atmosphere and/or a spring, and the damping piston is configured as a complete cartridge and tuned to reaction chamber pressure peaks.

A refinement of this type, in which the side, remote from the reaction chamber, of the damping piston is stressed counter to atmosphere and/or a spring, has proven cost effective and simple to implement. Here, configuring the damping piston as a complete cartridge is likewise an advantageous and easily implementable measure for reducing the pressure peaks which occur.

The use of a complete cartridge or a closed system advantageously prevents problems occurring as a result of contamination or other external influences.

Furthermore, in one alternative refinement and development of the invention, there may be provision for the side, remote from the active reaction chamber, of the damping piston to be connected to the passive reaction chamber.

Additionally, in order to avoid severe oscillations of the individual reaction pressures and the effect that the oscillations in the pressure difference do not act exclusively on the surface of the reaction piston but are absorbed by the damping piston, a connection to the passive reaction chamber enables the two reaction pressures to remain in phase. The phase relation of the pressure in the active reaction chamber is thus virtually identical to that in the passive reaction chamber. Advantageously, such a design of the damping piston can also be configured as a complete cartridge, with a spring/piston combination tuned to reaction chamber pressure peaks. Here, the piston can be damped or preferably configured to be smooth running. It is also feasible here to tune the springs/masses to dynamics.

It is advantageous if the damping piston is provided with the functions of a cutoff valve or of a pressure limiting valve.

Adding the functions of a serial production cutoff valve to the damping piston makes a reduction in the number of parts and therefore also particularly inexpensive production possible. Restrictor bores, control and sealing edges, proportional to the relatively low spring stiffness of the spring of the damping piston, must be integrated in appropriate positions in order for it to be possible to ensure the functioning of the cutoff valve in a combination with the damping piston. The damping piston is therefore configured in such a way that the overpressure is reduced from a desired point on the path of the damping piston. The damping piston operates in the abovedescribed advantageous manner in the region below said overpressure reduction.

Advantageous refinements and developments of the invention emerge from the further subclaims and from the exemplary embodiments specified in outline form in the following text using the drawings.

IN THE DRAWINGS

DESCRIPTION OF THE PREFERRED EMBODIMENTS

The power steering system according to the invention for motor vehicles with a rotary slide valve has a construction which is known in principle, as described, for example, in DE 197 40 352 A1 and DE 197 47 639 A1, for which reason a more detailed description in the following text will be dispensed with. Therefore, only the features which are relevant to the invention will be explained in greater detail in the following text.

Figure 1:
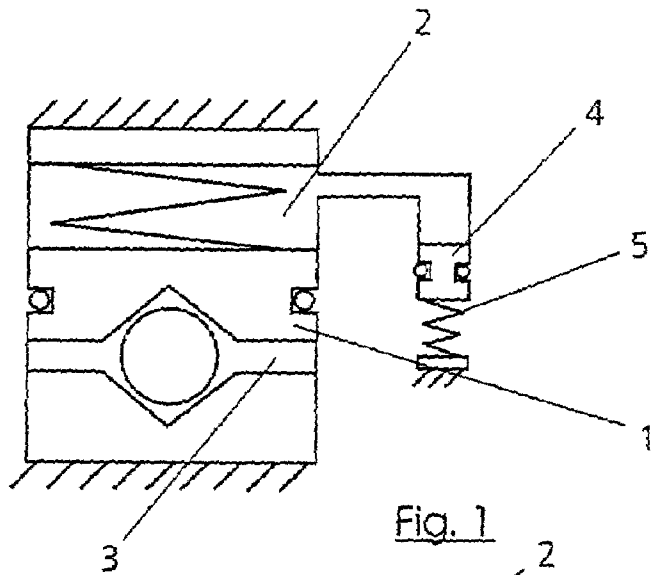
FIG. 1 shows a schematic representation of a first embodiment of a reaction piston with an active and passive reaction chamber and a damping piston.

FIG. 1 shows a reaction piston 1 of a power steering system (not shown) for motor vehicles, said reaction piston 1 delimiting an active reaction chamber 2 and a passive reaction chamber 3. In a manner which is known and therefore not described in greater detail, it is possible to supply a boost pressure to the active reaction chamber 2 in order to change an actuating force at a steering handle (not shown).

A damping piston 4 is connected to the active reaction chamber 2 in order to absorb dynamic oscillations or to avoid severe oscillations of the individual reaction pressures. As can be seen from FIG. 1, the damping piston 4 serves as a pressure accumulator which is able to absorb dynamic excitations and makes it possible to change the volume. Therefore, the oscillations no longer act exclusively on the surface of the reaction piston 1, but are mainly absorbed by the damping piston 4. The susceptibility to jolting, which leads to decreases in comfort as a result of torque jolts at the steering wheel, is thus considerably reduced or can no longer be sensed by the driver.

As can likewise be seen from FIG. 1, the side, remote from the active reaction chamber 2, of the damping piston 4 is stressed counter to a spring 5. As an alternative to this, it is also possible to stress the side, remote from the active reaction chamber 2, of the damping piston 4 counter to atmosphere. The spring 5 is advantageously adjusted in such a way that the damping piston 4 settles given constant pressure conditions and reacts quickly to dynamic fluctuations if they occur and makes an appropriate change in volume possible. The damping piston 4 can be of damped and/or smooth running configuration.

In experiments and calculations, it has emerged that configuring the spring 5 as a particularly weak spring with a spring stiffness between 0.2 and 2 N/mm is advantageously suitable for absorbing dynamic oscillations.

Configuring the damping piston 4 as a complete cartridge has proved to be particularly suitable with regard to series production and a configuration as a closed system shielded, in particular, from soiling or other external influences. Here, the damping piston 4 can be tuned to reaction chamber pressure peaks. It is feasible to tune the springs/masses to dynamics for this purpose.

Figure 2:
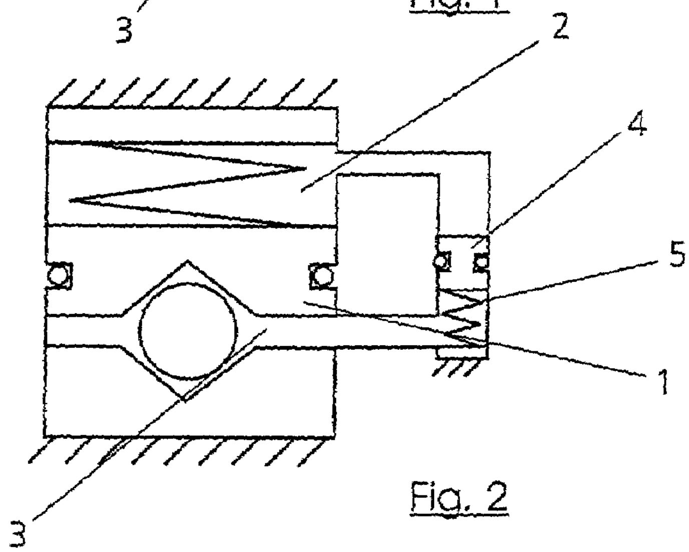
FIG. 2 shows a schematic representation of a second embodiment of a reaction piston with an active and passive reaction chamber and a damping piston.

FIG. 2 shows an alternative refinement which differs from the refinement described in FIG. 1 by the fact that the side, remote from the active reaction chamber 2, of the damping piston 4 is connected to the passive reaction chamber 3. As a result, the phase relation of the pressure in the active reaction chamber 2 advantageously corresponds virtually to the phase relation of the pressure in the passive reaction chamber 3. The construction of the damping piston 4, in particular also as a complete cartridge, with a spring/piston combination, tuned to reaction chamber pressure peaks, can be analogous to the embodiment described in FIG. 1.

In an alternative and advantageous refinement, the damping piston 4 shown schematically in FIG. 2 can be provided with the functions of a cutoff valve or of a pressure limiting valve, which makes it possible to reduce a defined overpressure. Cutoff valves or pressure limiting valves, which realize the functions of an overpressure valve, are in principle already known with regard to their functions, for which reason they will not be discussed in greater detail in the following text. Integrating the function of a cutoff valve makes it advantageously possible to reduce the number of parts and thus achieve a particularly cost effective configuration close to series production.

Figure 4:
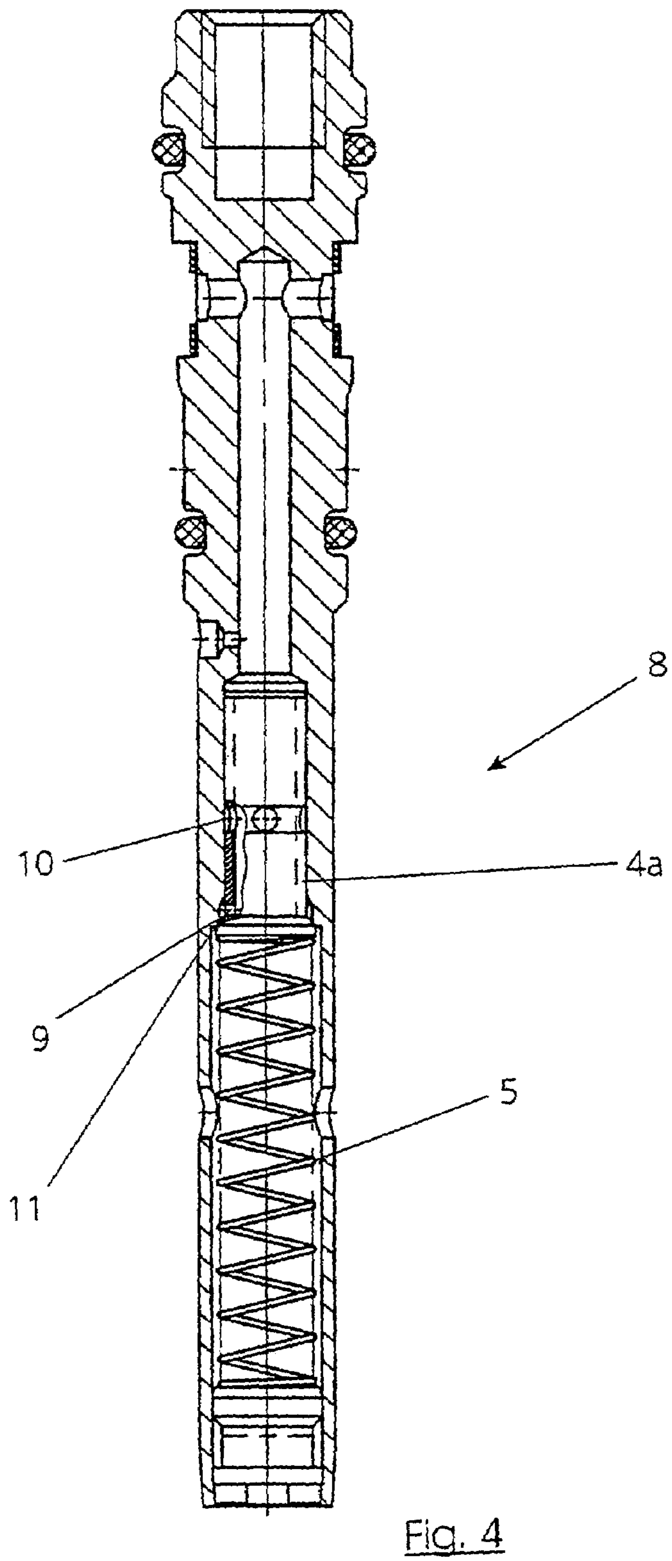
FIG. 4 shows a cutoff valve which is provided with a damping piston according to the invention.

The basic construction of a cutoff valve, which is provided with a damping piston 4 or the solution according to the invention, is shown in greater detail in FIG. 4. It can be seen here that the spring 5 is configured as a particularly weak spring with the spring stiffness already defined in greater detail, so that the abovedescribed functioning of the damping piston 4 on a relatively long travel path is possible, with the required reaction time to dynamic processes, and the desired overpressure reduction takes place only starting from a defined overpressure, i.e. a defined position of the damping piston 4. An appropriate overpressure opening, which is described in greater detail in FIG. 4, has to be arranged at this location in a known manner.

Figure 3:
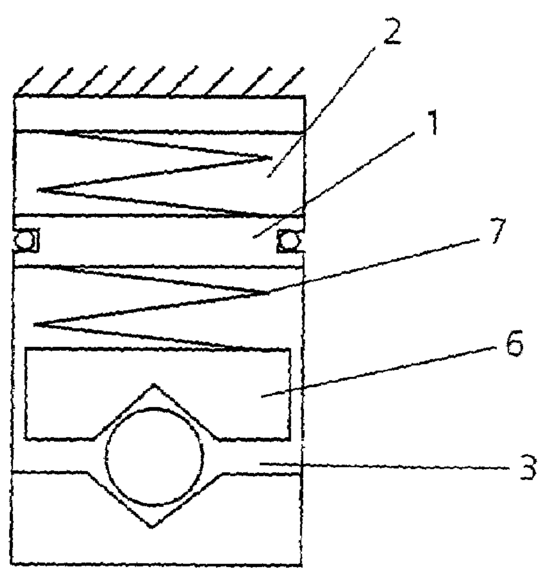
FIG. 3 shows a schematic representation of a reaction piston with an active and passive reaction chamber having a centering piece and a decoupling element.

FIG. 3 shows a reaction piston 1, in which the known "centering" and "piston" functions are decoupled. For this purpose, a centering piece 6 is arranged in the passive reaction chamber 3 and connected to the reaction piston 1 by means of a decoupling element 7. In the exemplary embodiment shown, the decoupling element is configured as a decoupling spring 7. The centering piece 6 is advantageously floatingly arranged in the reaction chamber 3. The alternative solution, shown in FIG. 3, likewise avoids an excessively severe oscillation of the individual reaction pressures and makes it possible for the reaction pressures to remain in phase.

In a further alternative embodiment (not shown), there can also be provision for the reaction piston 1 to have a diaphragm, which is arranged between the active reaction chamber 2 and the passive reaction chamber 3. In this way, the functioning of the embodiment already described in FIG. 2 is achieved in an analogous manner, and it is possible to dispense with the use of a damping piston 4.

FIG. 4 shows a cutoff valve 8 which is provided with the functions of the damping piston 4. For this purpose, the cutoff valve 8 has appropriate restrictor bores 9, 10 and control and sealing edges 11. The positions of the restrictor bores 9, 10 and the control and sealing edges 11 have to be adapted here to the low strength or the particularly weak spring 5.

FIG. 4 shows both a damping piston 4, which is provided with the functions of a serial production cutoff valve 8 or pressure limiting valve, and also a serial production cutoff valve 8 or pressure limiting valve, which is provided with a weak spring 5, such that a piston 4*a* of the cutoff valve 8 or of the pressure limiting valve reacts almost without delay to dynamic oscillations of the reaction chamber pressures. An embodiment of a serial production cutoff valve 8, with a spring 5 which is so weak that a piston 4*a* of the cutoff valve 8 reacts almost without delay to the abovedescribed oscillations and thus takes over the abovedescribed function of a damping piston 4, can be realized in series production particularly advantageously and with little outlay. Such a configuration of a cutoff valve 8 contradicts the opinion predominantly held by experts up to now. The use of weak springs 5 has disadvantages for the functioning of a cutoff valve 8 with regard to the use or installation of the spring in the cutoff valve 8, as weak and thus correspondingly long springs 5 are difficult to handle and, furthermore, have to be compressed or prestressed. Therefore, the springs 5 which have previously been used in cutoff valves 8 generally have a spring stiffness of approximately 12 N/mm. A spring with a high spring stiffness is also advantageous with regard to the installation space, as the distances to be covered by the piston 4*a* are thus shorter. As short a distance as possible from a zero position of the piston 4*a* to a position in which the control and sealing edge 11 opens is considered by experts to be advantageous. In contrast, with regard to the solution according to the invention, a serial production cutoff valve 8 or pressure limiting valve is modified by the use of a weak spring 5 in such a way that it is possible to absorb dynamic oscillations of the reaction chamber pressures. For this purpose, the restrictor bores 9, 10 and the control and sealing edges 11 have to be arranged in accordance with the substantially lower strength of the spring 5. For this purpose, the spring 5 has a spring stiffness of 0.1 to 2 N/mm, preferably 0.4 to 0.6 N/mm.

As has already been mentioned, the exemplary embodiment shown in FIG. 4 represents a serial production cutoff valve which is provided with the concept according to the invention for suppressing dynamic disturbances. In principle, however, the cutoff valve 8 shown is structurally identical to a damping piston 4*a* which is provided with the functions of a cutoff valve. The concept according to the invention for suppressing dynamic oscillations or for reducing the susceptibility to jolting, which leads to torque jolts at the steering handle, can be implemented cost effectively by combining the two functions.

The cutoff valve 8 shown in FIG. 4 corresponds in principle to the construction of a known cutoff valve or pressure limiting valve, for which reason only the features relevant to the invention or the necessary modifications, such as the location of the restrictor bores 9, 10 or of the control and sealing edges 11, are discussed in greater detail in the following text.

In order to reduce the susceptibility to jolting, an adapted change in the opening cross section by means of the control edges 11 is employed, or the spring stiffness is employed with regard to a change in volume. However, it is also possible to combine the two procedures. In contrast to a serial production cutoff valve 8, the restrictor bores 9, 10 or the control and sealing edges 11 are arranged in such a way that a longer travel, which is adapted to the lower strength of the spring 5, of the piston 4*a* is necessary to completely open the overpressure function. Here, there may be provision according to the invention for the spring 5 to be prestressed counter to a first opening pressure. This has the consequence that the piston 4*a* is only lifted off above a certain pressure. When the piston 4 is lifted off or the piston 4*a* is moved toward the spring 5, the smaller restrictor bore 9 is active initially. Only when the pressure is increased further is the large restrictor bore 10 active. The restrictor bores 9, 10 are active here in a known manner when the control and sealing edges 11 are reached.

As can be seen from FIG. 4, the opening cross section is enlarged when a pressure peak occurs, so that it is possible for the pressure peak to be reduced. A corresponding change in volumetric flow results from this.

In the exemplary embodiment shown, there may be provision for the spring 5 to be prestressed counter to an opening pressure of 3 bar. If a pressure greater than 3 bar occurs, for example 4 or 5 bar, the piston 4*a* travels a longer distance in comparison with the previously known cutoff valves. As a result, the cross sections are opened more quickly and to a greater extent, as a result of which the dynamic pressure peaks are correspondingly reduced. Although small pressure peaks, for example below 3 bar, cannot be absorbed using the solution according to the invention on account of the prestressing of the spring 5, it has been discovered in experiments that the pressure peaks which cause the susceptibility to jolting lie mainly in the region from 5 to 10 bar, in particular in the region from 6 to 7 bar, in which it is advantageously possible to reduce pressure peaks by means of the piston 4*a* shown in FIG. 4 or the spring 5.

In order to implement the solution shown in FIG. 4, the recognition is also essential that the pressure peaks which occur are only active for a very short time, so that conventionally employed springs 5 have virtually failed to react to said pressure peaks. In contrast to known cutoff valves, the distance between the restrictor bore 9 and the restrictor bore 10 must consequently be substantially larger. By selecting the prestressing of the spring 5 or the distance between the restrictor bores 9, 10, the cutoff valve 8 according to the invention can be configured in such a way that the pressure at which the cutoff valve 8 first opens and the pressure at which the overpressure function commences are identical to those of a conventional cutoff valve. Here, the difference lies only in the weaker spring 5 and the restrictor bores 9, 10 arranged in an appropriately offset manner.

LIST OF DESIGNATIONS

1 Reaction piston
2 Reaction chamber (active)
3 Reaction chamber (passive)
4 Damping piston
5 Spring
6 Centering piece
7 Decoupling element, decoupling spring
8 Small restrictor bore
9 Large restrictor bore
10 Control and sealing edges

What is claimed is:

1. A power steering system for motor vehicles, having a rotary slide valve which has a reaction piston which delimits an active and a passive reaction chamber, it being possible to supply a boost pressure to the active reaction chamber in order to change an actuating force at the steering handle, wherein a damping piston is connected to the active reaction chamber in order to absorb dynamic oscillations of the reaction pressure.

2. The power steering system as claimed in claim 1, wherein the side, remote from the active reaction chamber, of the damping piston is stressed counter to atmosphere and/or a spring.

3. The power steering system as claimed in claim 1 or 2, wherein the damping piston is of damped and/or smooth running configuration.

4. The power steering system as claimed in claim 1 or 2, wherein the damping piston is configured as a complete cartridge and is tuned to reaction chamber pressure peaks.

5. The power steering system as claimed in claim 1 or 2, wherein the side, remote from the active reaction chamber, of the damping piston is connected to the passive reaction chamber.

6. The power steering system as claimed in claim 1 or 2, wherein the damping piston has a weak spring whose spring stiffness is preferably between 0.1 and 2 N/mm.

7. The power steering system as claimed in claim 1 or 2, wherein the damping piston is provided with the functions of a cutoff valve or of a pressure limiting valve.

8. The power steering system as claimed in claim 7, wherein the damping piston has restrictor bores and control and sealing edges in accordance with the functions of a cutoff valve.

9. The power steering system as claimed in claim 8, wherein the restrictor bore and the control and sealing edges are arranged in accordance with the low strength of the spring.

10. A power steering system for motor vehicles, having a rotary slide valve which has a reaction piston which delimits an active and a passive reaction chamber, it being possible to supply a boost pressure to the active reaction chamber in order to change an actuating force at the steering handle, wherein a centering piece is arranged in the passive reaction chamber and is connected to the reaction piston by means of a decoupling element.

11. The power steering system as claimed in claim 10, wherein the decoupling element is configured as a decoupling spring.

12. The power steering system as claimed in claim 10 or 12, wherein the centering piece is floatingly arranged in the passive reaction chamber.

13. A power steering system for motor vehicles, having a rotary slide valve which has a reaction piston which delimits an active and a passive reaction chamber, it being possible to supply a boost pressure to the active reaction chamber in order to change an actuating force at the steering handle, wherein a cutoff valve or pressure limiting valve is provided with a weak spring, such that a piston of the cutoff valve or of the pressure limiting valve reacts almost without delay to dynamic oscillations of the reaction chamber pressures.

14. The power steering system as claimed in claim 13, wherein restrictor bores and control and sealing edges of the cutoff valve or of the pressure limiting valve are arranged in accordance with the low strength of the spring.

15. The power steering system as claimed in claim 14, wherein the restrictor bore and the control and sealing edges are arranged in such a way that relatively long travel, matched to the relatively low strength of the spring, of the piston is required in order to completely open the overpressure function.

16. The power steering system as claimed in one of claims 13, 14 or 15, wherein the spring is prestressed counter to a first opening pressure.

17. The power steering system as claimed in one of claims 13, 14 or 15, wherein the spring has a spring stiffness of 0.1 to 2 N/mm, preferably 0.4 to 0.6 N/mm.

* * * * *